(12) United States Patent
Kulikov et al.

(10) Patent No.: US 8,226,104 B2
(45) Date of Patent: Jul. 24, 2012

(54) ENERGY EFFICIENT TRICYCLE

(76) Inventors: Konstantin Kulikov, Rochester, MN (US); Sergey Cheprasov, Glenview, IL (US)

( * ) Notice: Subject to any disclaimer, the term of this patent is extended or adjusted under 35 U.S.C. 154(b) by 177 days.

(21) Appl. No.: 12/882,198

(22) Filed: Sep. 15, 2010

(65) Prior Publication Data

US 2012/0061942 A1    Mar. 15, 2012

Related U.S. Application Data

(60) Provisional application No. 61/242,057, filed on Sep. 14, 2009.

(51) Int. Cl.
*B62K 5/02* (2006.01)
(52) U.S. Cl. ......... 280/287; 280/278; 280/239; 280/282
(58) Field of Classification Search .................. 280/287, 280/278, 282, 239
See application file for complete search history.

(56) References Cited

U.S. PATENT DOCUMENTS

| | | | |
|---|---|---|---|
| 4,691,930 A | 9/1987 | Samuel | |
| 5,240,267 A * | 8/1993 | Owsen | 280/240 |
| 5,536,029 A | 7/1996 | Gramckow | |
| 5,553,879 A | 9/1996 | Niemeyer et al. | |
| 7,059,621 B2 * | 6/2006 | Di Blasi et al. | 280/287 |
| 2003/0151225 A1 | 8/2003 | Lopez | 280/282 |
| 2004/0090039 A1 * | 5/2004 | Borochov et al. | 280/282 |
| 2008/0277901 A1 * | 11/2008 | Catelli et al. | 280/287 |
| 2010/0301582 A1 * | 12/2010 | Tsai | 280/278 |

FOREIGN PATENT DOCUMENTS

GB    WO 9922980 A1    5/1999

* cited by examiner

*Primary Examiner* — Lesley D Morris
*Assistant Examiner* — Marlon Arce
(74) *Attorney, Agent, or Firm* — Patwrite LLC; Mark David Torche

(57) ABSTRACT

An energy efficient tricycle has a frame, fork and handlebars connected to hold a front wheel and two rear wheels. A power and transmission assembly means is mounted on the frame to provide power to both rear wheels. A pair of pedals are independently operable and used to provide the torque needed to propel the tricycle. A motorized embodiment is also provided to provide additional power when needed or to completely motorize the tricycle. The pedals are mounted so that they travel in a vertical path. The handlebars, front wheel and both rear wheels are foldable to allow the tricycle to fit within a vehicle. The tricycle has a very low center of gravity. A seat is provided in one embodiment to allow a user to sit and operate using a motor.

16 Claims, 14 Drawing Sheets

ENERGY EFFICIENT TRICYCLE

CROSS REFERENCE TO RELATED APPLICATIONS

This application claims priority and herein incorporates by reference U.S. provisional patent application 61/242,057, filed Sep. 14, 2009.

BACKGROUND OF THE INVENTION

Throughout the world, bicycle production and use still outnumbers automobile production and use almost two to one. Bicycles have the advantage of not requiring fuel or at least very little for the powered versions compared to automobiles. Additionally, maintenance is much more accessible and allows even relatively poor users to keep their bicycle operational.

Of course some of the advantages of bicycle are also a detriment to their use. They require much more human effort to use and they are less comfortable in general than some other forms of transportation. Additionally, bicycles are inherently unstable unless in motion. Tricycles use three wheels and obviate this problem by stabilizing the tricycle without relying on gyroscopic principles. Tricycles generally provide more space to carry things and for more comfortable seating than most bicycles.

Tricycles gain stability at the expense of steering control because unlike a bicycle which leans in a turn, tricycles generally rely on turning the front wheel which is less maneuverable.

There is a need for a stable tricycle that provides maneuverability, ease of use and economy in operating costs that overcomes the shortcomings of the prior art.

SUMMARY OF THE INVENTION

An energy efficient tricycle has a frame, fork and handlebars connected to hold a front wheel and two rear wheels. A power and transmission assembly means is mounted on the frame to provide power to both rear wheels. A pair of pedals are independently operable and used to provide the torque needed to propel the tricycle. A motorized embodiment is also provided to provide additional power when needed or to completely motorize the tricycle. The pedals are mounted so that they travel in a vertical path. The handlebars, front wheel and both rear wheels are foldable to allow the tricycle to fit within a vehicle. The tricycle has a very low center of gravity. A seat is provided in one embodiment to allow a user to sit and operate using a motor.

Other features and advantages of the instant invention will become apparent from the following description of the invention which refers to the accompanying drawings.

DETAILED DESCRIPTION OF THE INVENTION

Figure 1:
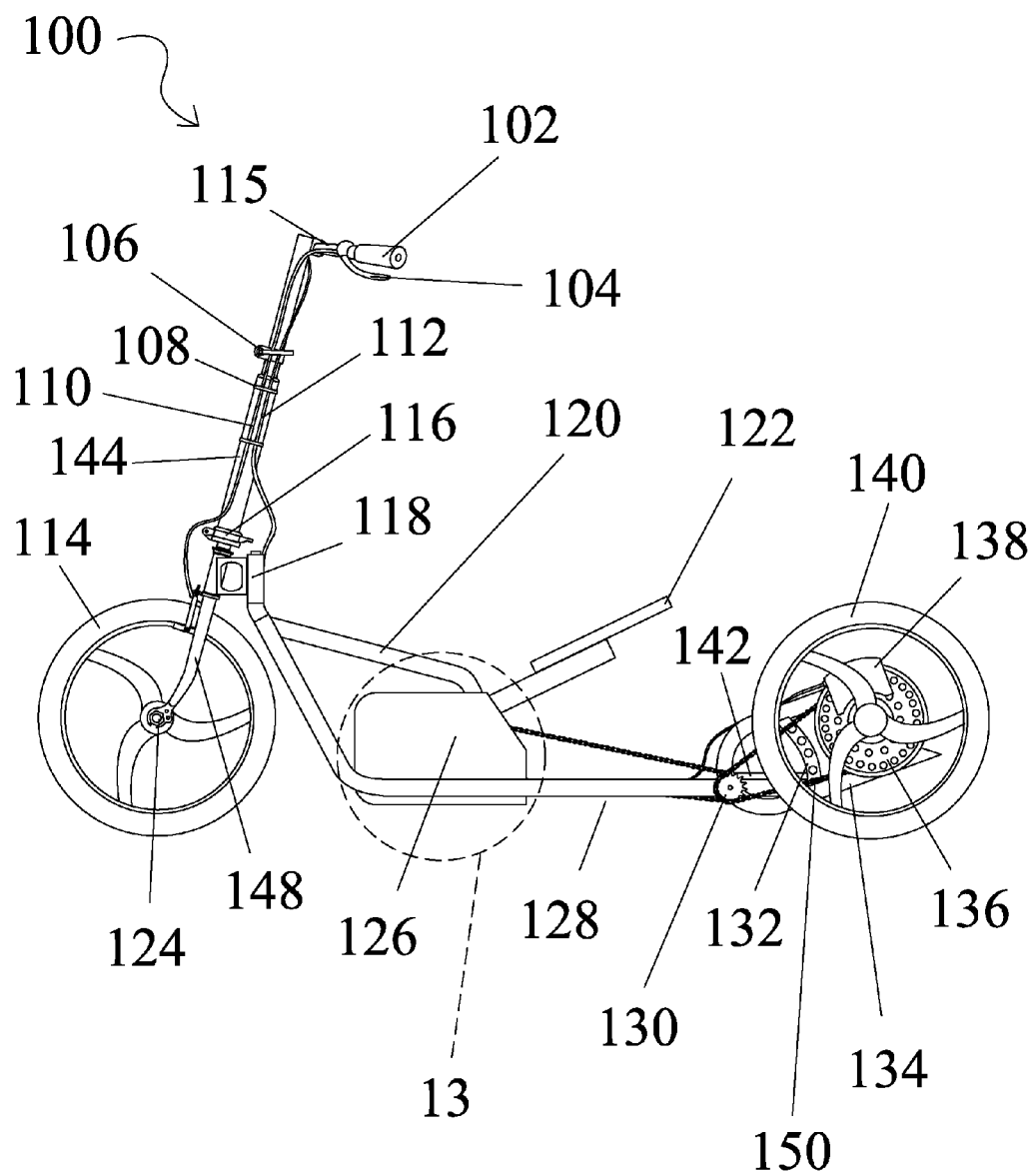
FIG. 1 is a side view of an energy efficient tricycle according to an embodiment of the invention.
Figure 2:
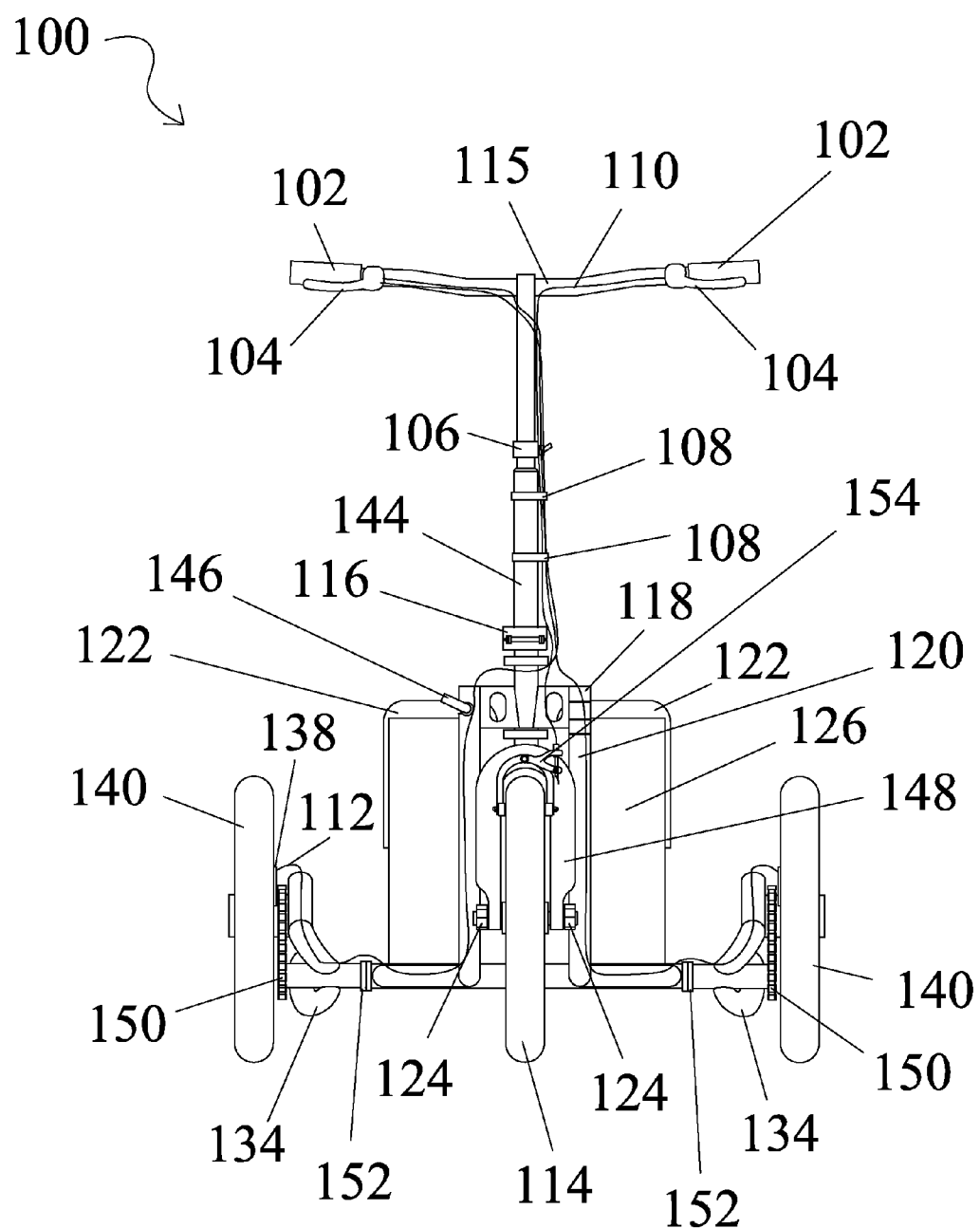
FIG. 2 is a front view of the energy efficient tricycle shown in FIG. 1.
Figure 3:
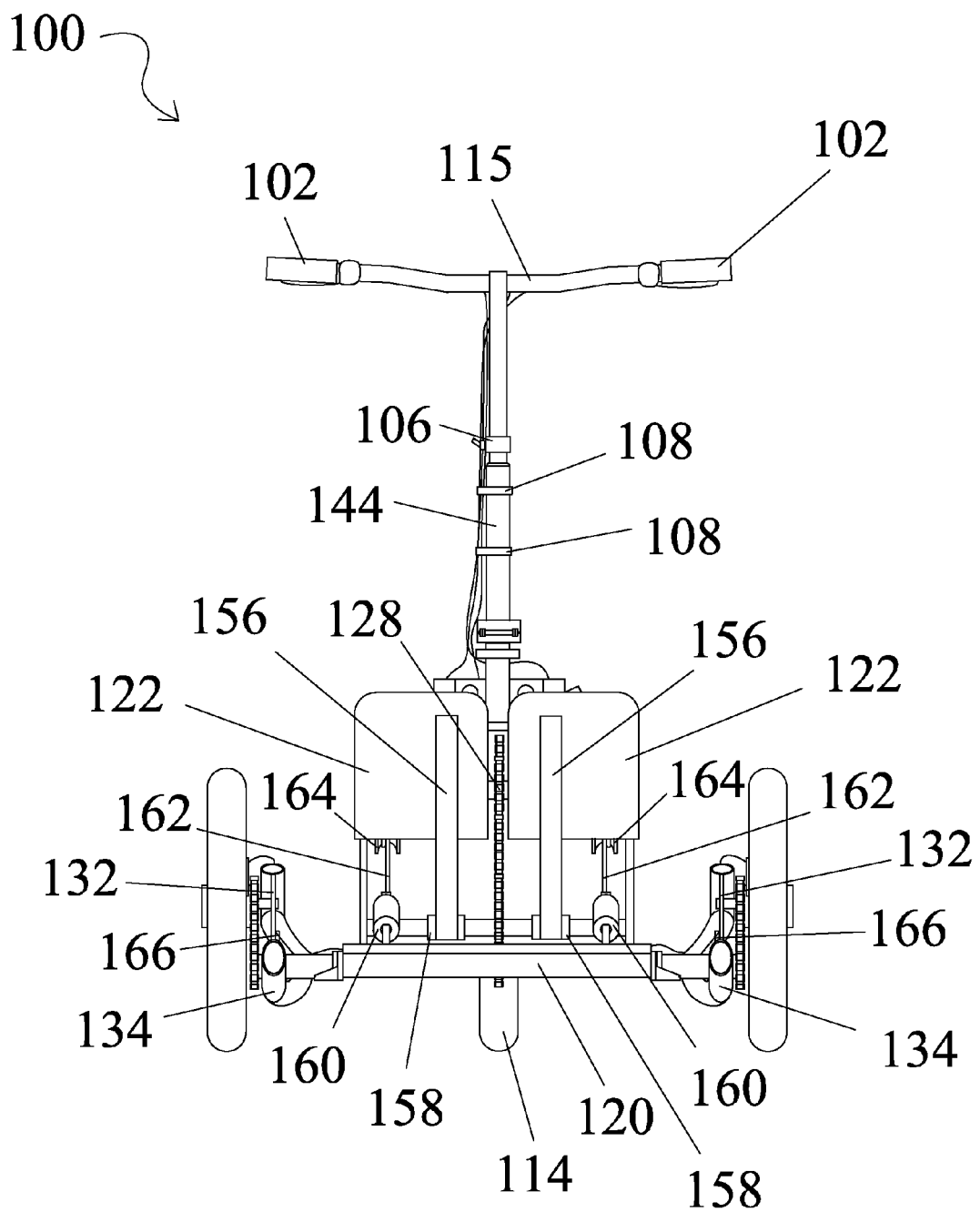
FIG. 3 is back view of the energy efficient tricycle shown in FIG. 1.
Figure 4:
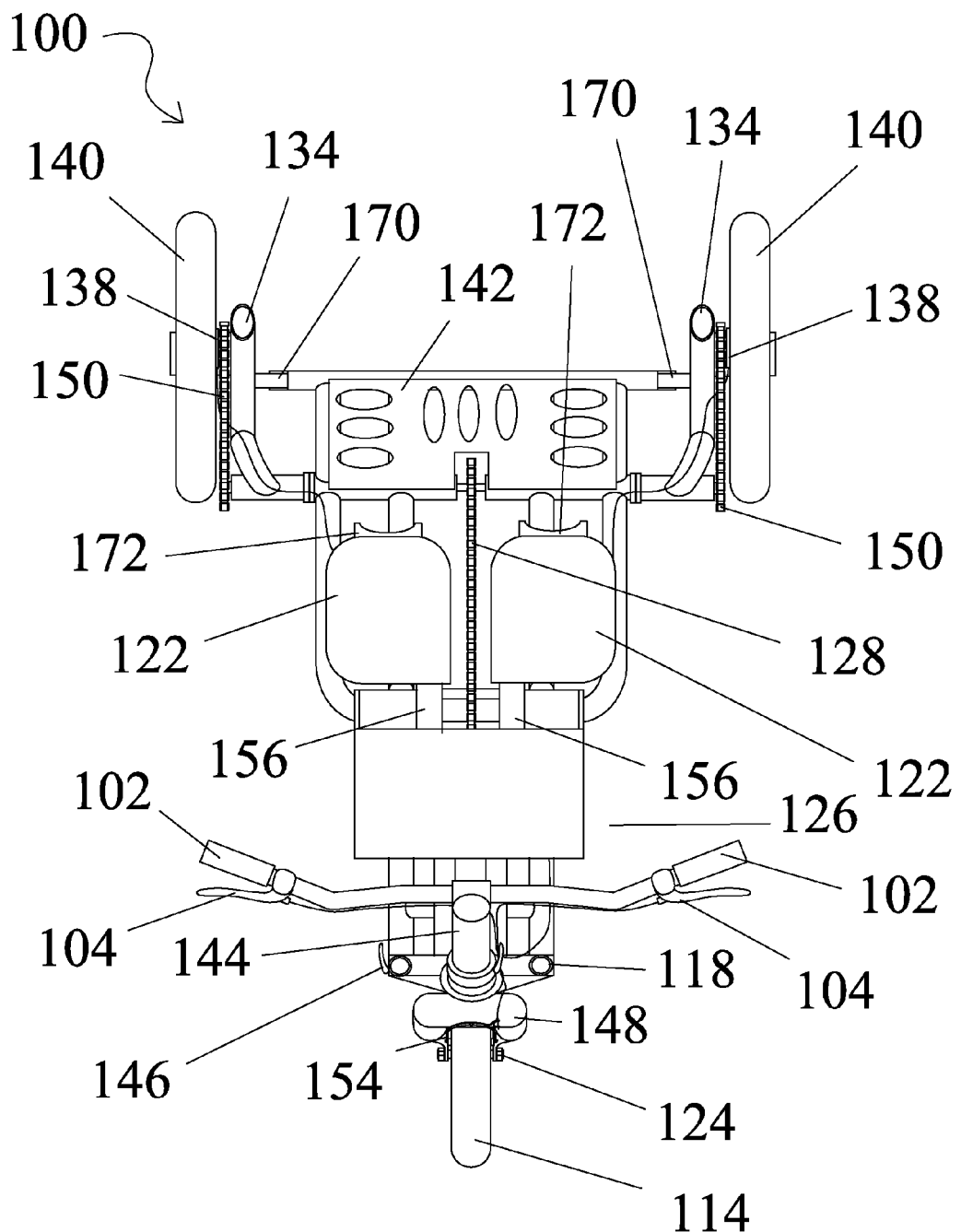
FIG. 4 is a top view of the energy efficient tricycle shown in FIG. 1.
Figure 5:
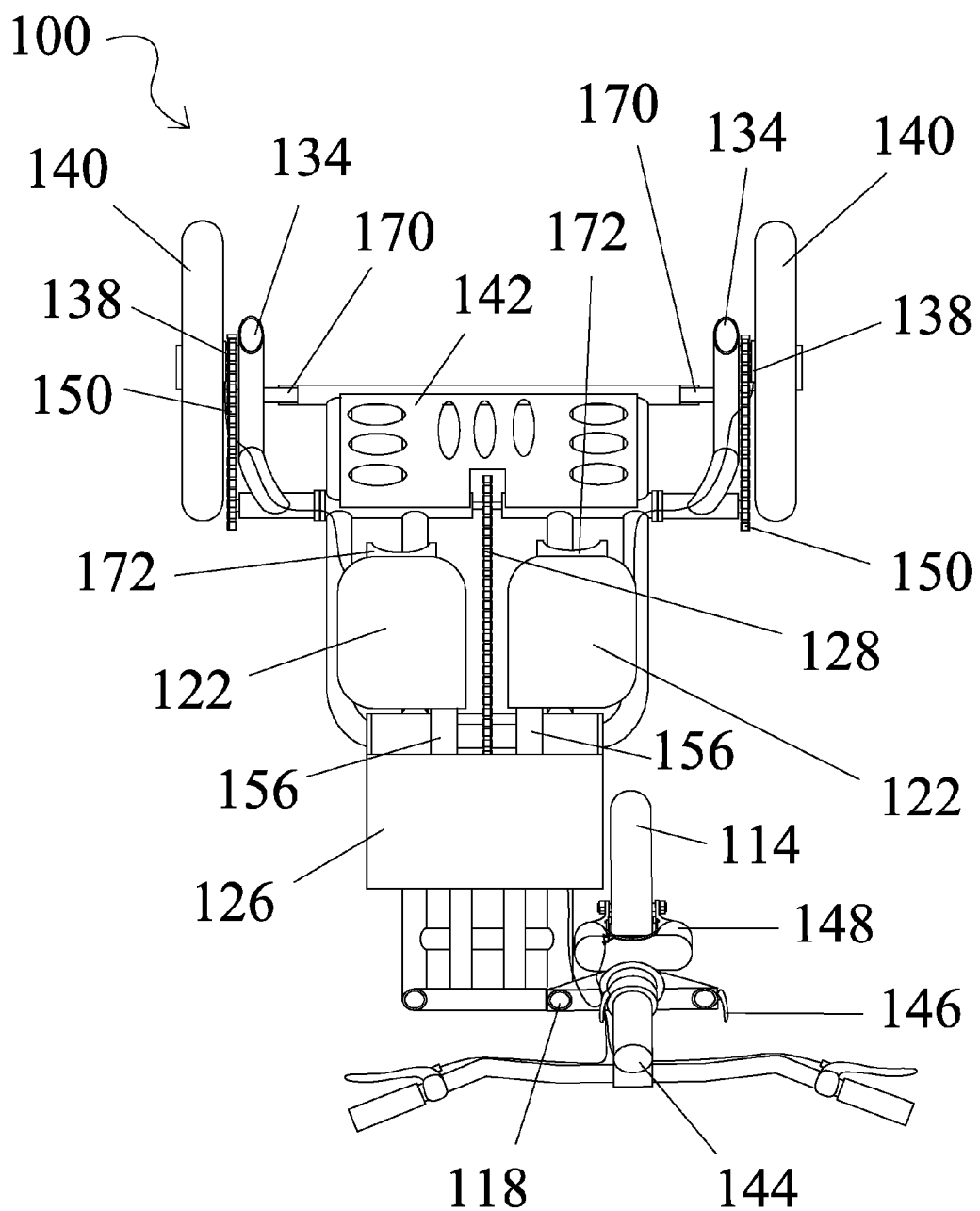
FIG. 5 is a top view showing the front wheel in a folded position of the of the energy efficient tricycle shown in FIG. 1.
Figure 6:
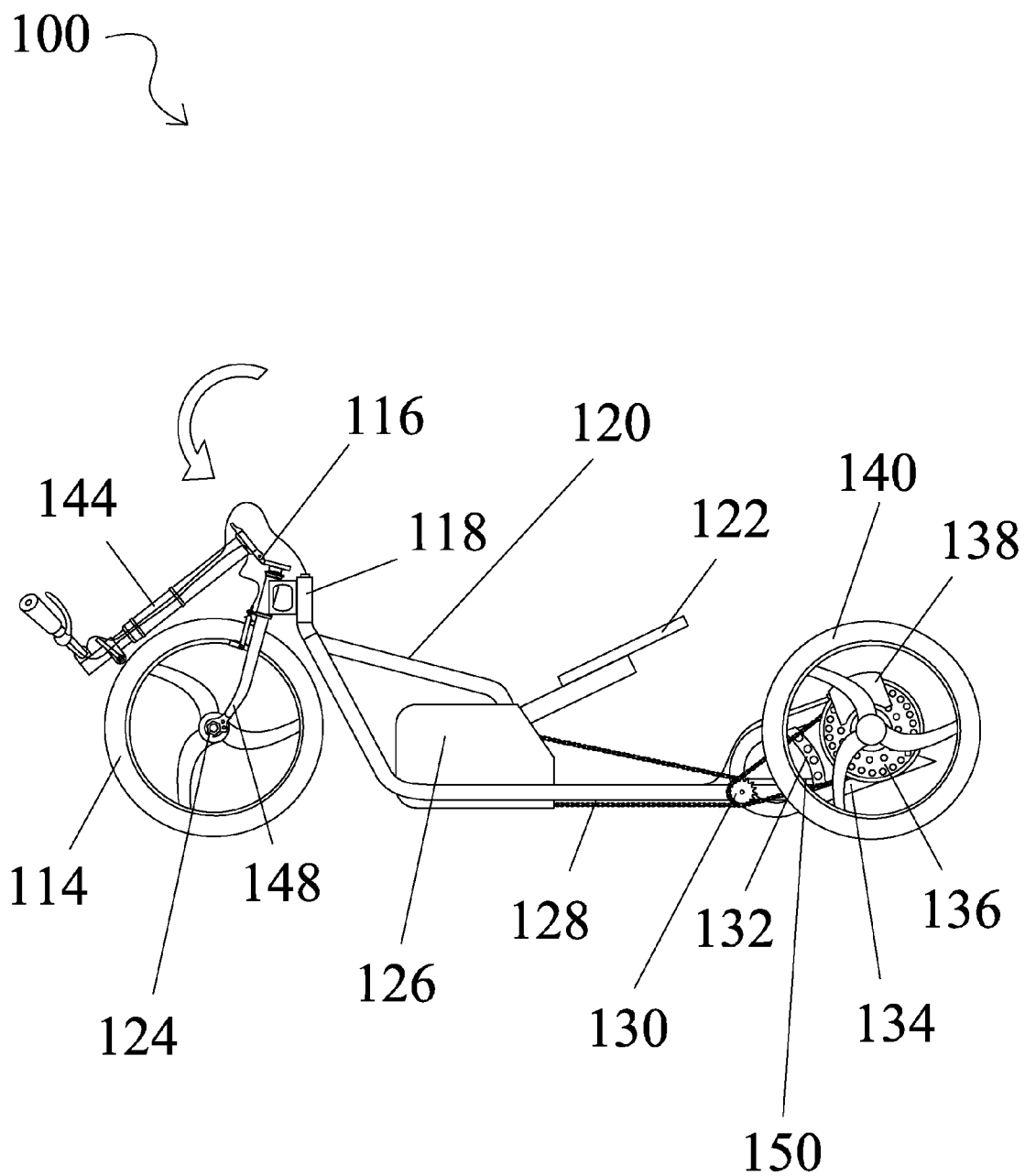
FIG. 6 is a side view showing the steering tube in a folded position of the energy efficient tricycle shown in FIG. 1.
Figure 7:
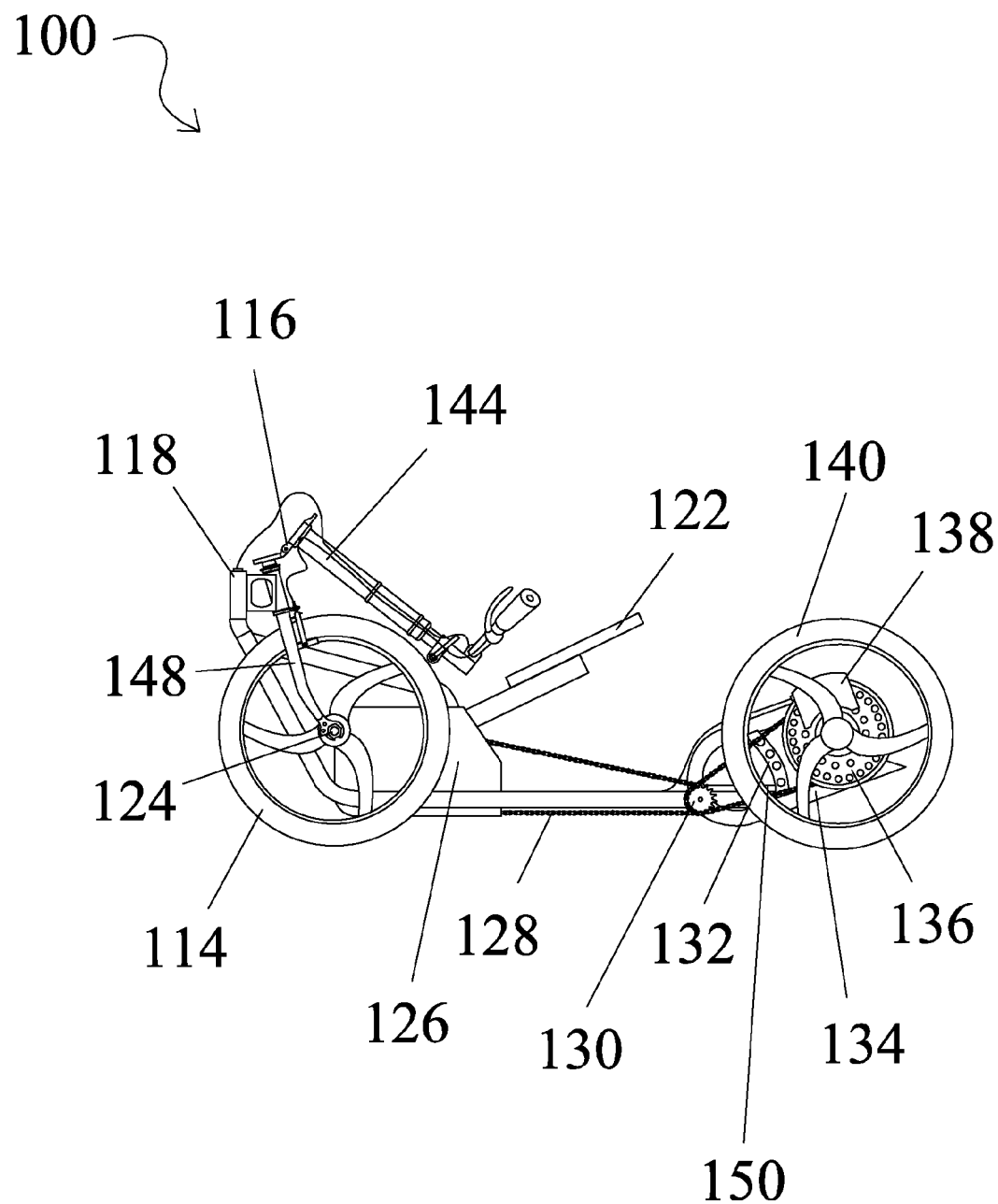
FIG. 7 is a side view showing the steering tube and front wheel in the folded position.
Figure 8:
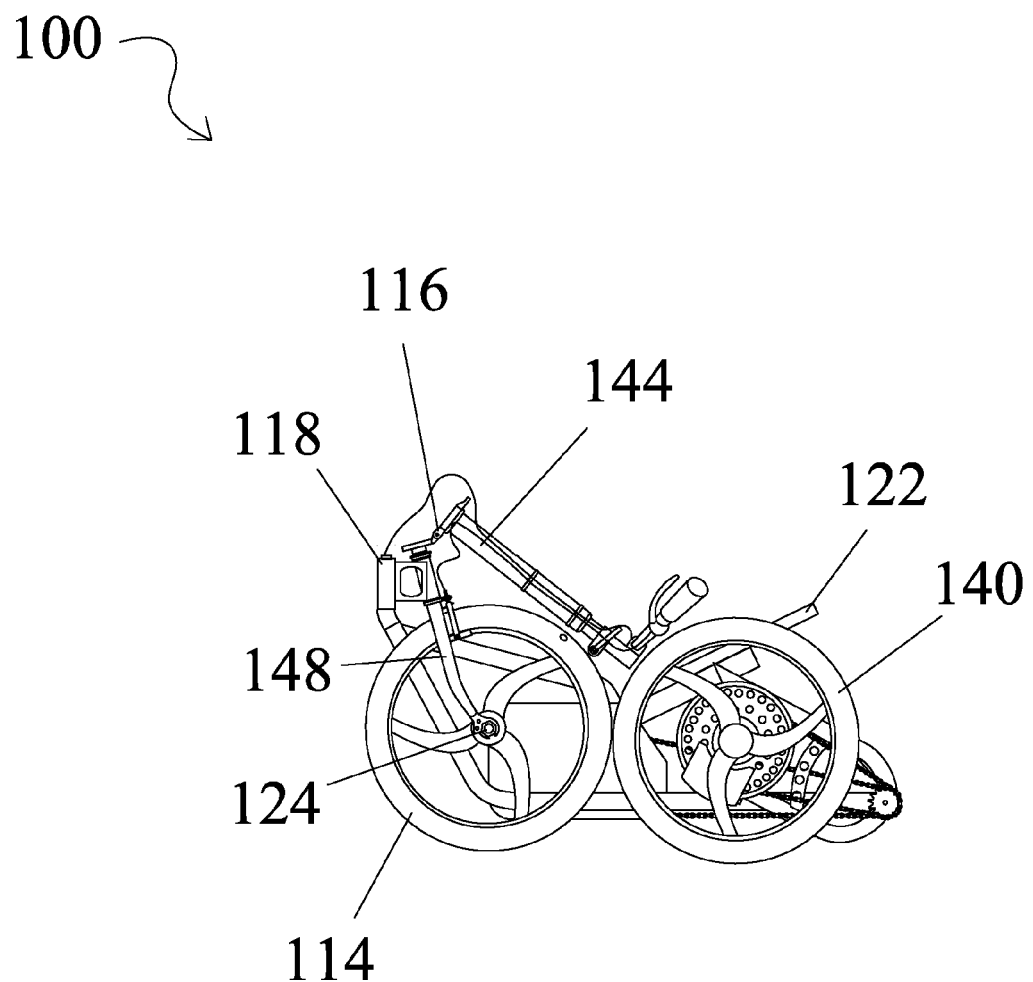
FIG. 8 is a side view showing the steering tube, front wheel and both rear wheels in the folded position.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1 through 4, an energy efficient tricycle 100 is shown having a frame 120. Frame 120 is lightweight and strong. It is made of a high carbon steel such as chromoly, aluminum or even a carbon fiber composite as long as the frame remains strong yet flexible. A handlebar 115 telescopically fits within a steering tube 144. A clamp 106 selectively secures handlebars within steering tube 144. A front wheel 114 is secured with fork 148 which is rotatably attached to steering tube 144.

A front axle 124 is attached to fork 148 and allows wheel 114 to roll. A front hand brake 154 is provided to control front wheel 114. Handlebar 115 has two handgrips 102 and hand brakes 104. Brake cables 110 and 112 are secured using brake ties 108. In order to allow tricycle 100 to be easily transported and stored, a handlebar folding hinge 116 is provided and will be discussed in detail later. A rotating hinge lock 146 is provided to lock steering tube 144 in place during use and then to easily move into a storage position. A front wheel rotating hinge 118 is provided for folding as well. Two foot pedals 122 are provided to allow a user to apply a locomotive force. Each pedal 122 is independently operable and need not be in any special position to operate.

A cover 126 is provided to cover and protect the transmission, electronics and battery if so equipped. The downward force from pedals 122 is transmitted to the rear wheels 140 using a main drive chain 128. Of course, a belt or other force transmitting mechanism could be used as long as the downward force is able to be turned into a torque to turn the wheels 140. Two rear drive sprockets—one on each side 130 are provided to transmit the torque to the wheels 140. In operation, energy efficient tricycle 100 is able to operate over varying terrains by adjusting the height of the rear wheels 140 using an adjustment 132. A series of holes allow a user to select the desired height. A pin, or other detent fits within the hole to maintain the selected height.

Each rear wheel 140 is supported by a rear wheel support frame 134 is used both for structural purposes as well as providing the axle to support the wheels. This configuration allows the end portion of tricycle to be open and completely accessible. Because of this, a platform 142 is provided to allow easy access. The user can merely step on platform 142 and is ready to go.

To provide superior braking performance, disc brakes are provided on rear wheels 140. The disc brakes consist of a rotor 136 and caliper 138 for each rear wheel 140. Two rear wheel drive chains 150 are provided to transmit the torque from pedals 122 and main drive chain 128. To further enhance the foldability of tricycle 100, two rear wheel rotating bushing 152 are provided. During operation, rear wheel support frames 134 are securely held in place by rear wheel clamps 170. When released, rear wheels 140 may be rotated to a compact position.

Pedals 122 are rotatably attached to frame 120 using pedal arms 156 using a bearing or bushing 158. Also provided are two recoil pistons 160 which bias pedals 122 to an operable position and will be discussed in detail below.

Now referring to FIGS. 5 through 8, energy efficient tricycle 100 is able to fold for transportation and storage. Handlebar 115 telescopically slides down within steering tube 144 by loosening telescopic clamp 106 (FIG. 1) and then sliding al the way down and then retightening. Next handlebar rotating hinge is release and steering tube 144 folds down until it rests on front tire 114.

Now front wheel rotating hinge lock 146 is released and this allows front wheel assembly (wheel 114, fork 148, brake 154 and steering tube 144) to rotate around 180 degrees so that front wheel 114 is now facing an opposite direction and is alongside cover 126.

Next, rear wheel clamps 170 are released and rotated towards the front. In this configuration, tricycle 100 is in a very compact configuration which allows a user to easily carry and transport. It easily fits within a truck of a car, etc. To operate, the procedure is reversed.

Figure 9:
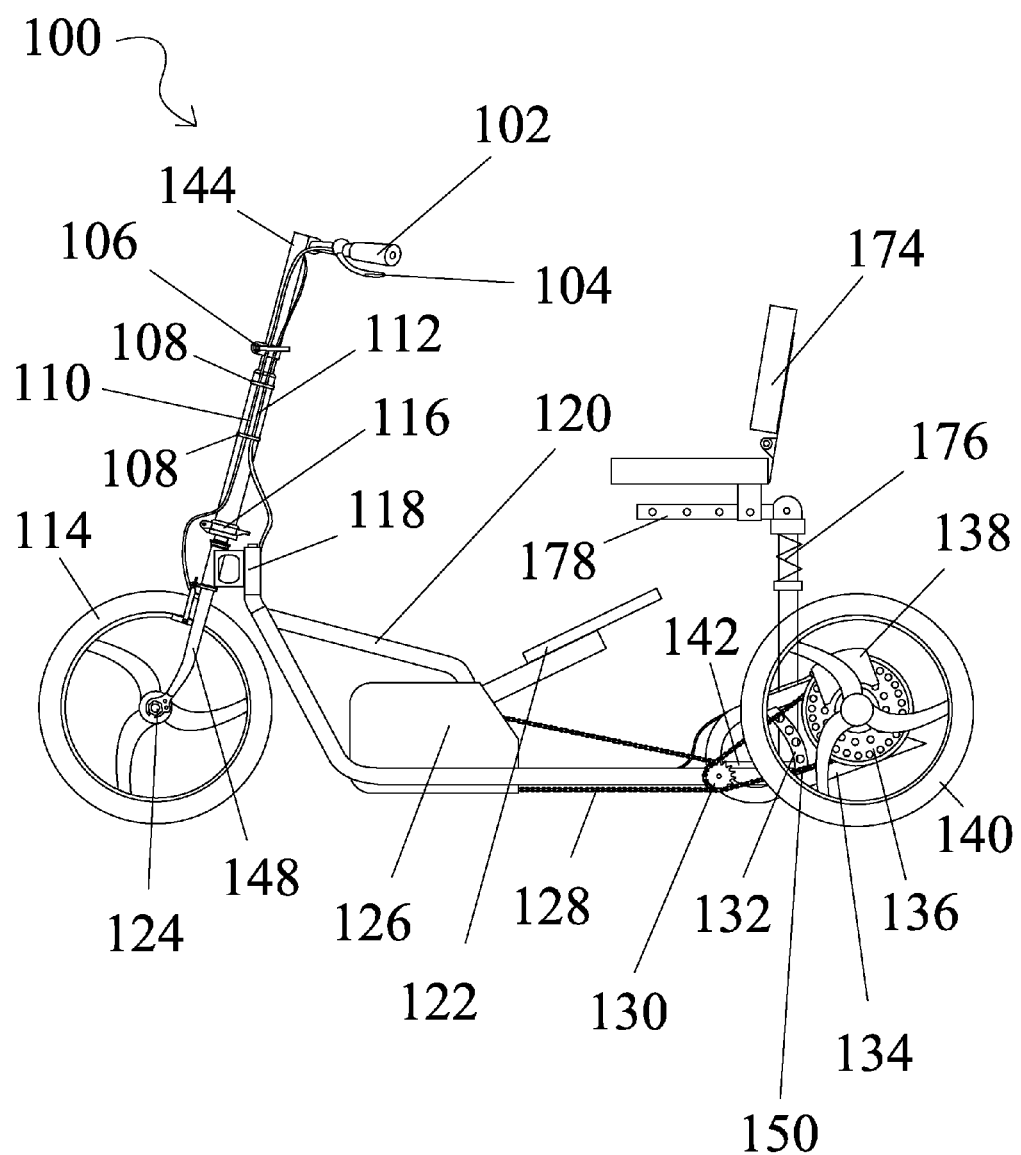
FIG. 9 is an energy efficient tricycle having a seat according to an embodiment of the invention.

Now referring to FIG. 9, a seat 174 is provided to allow a user to sit down while operating in a motorized embodiment. Seat 174 is cushioned by riding on a spring shock absorber 176 to absorb bumps and road conditions. Seat 174 may be adjusted forwards and backwards using seat adjustment 178. Additionally, a height adjustment may be provided (not shown).

Figure 10:
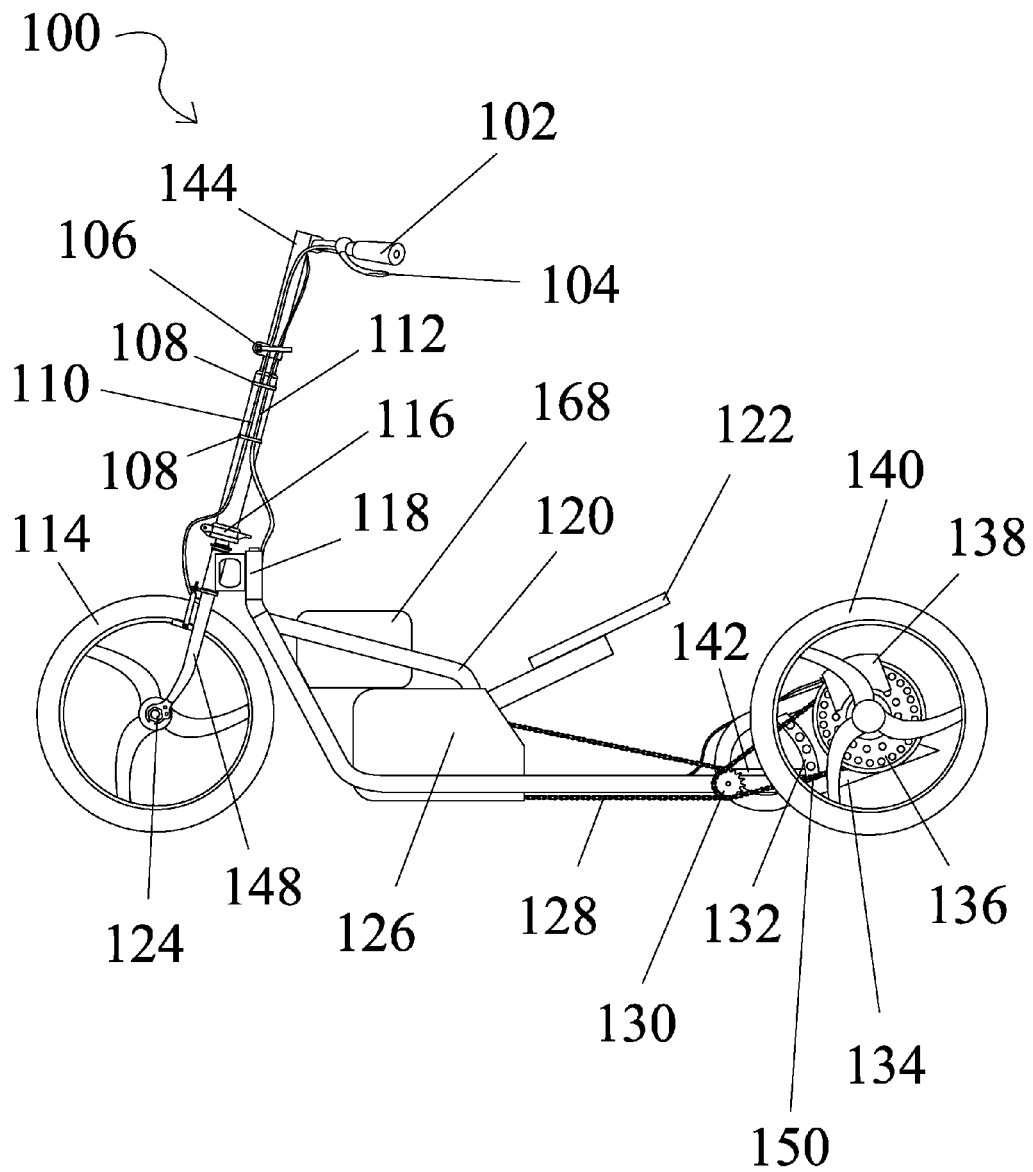
FIG. 10 is an energy efficient tricycle having a battery.
Figure 11:
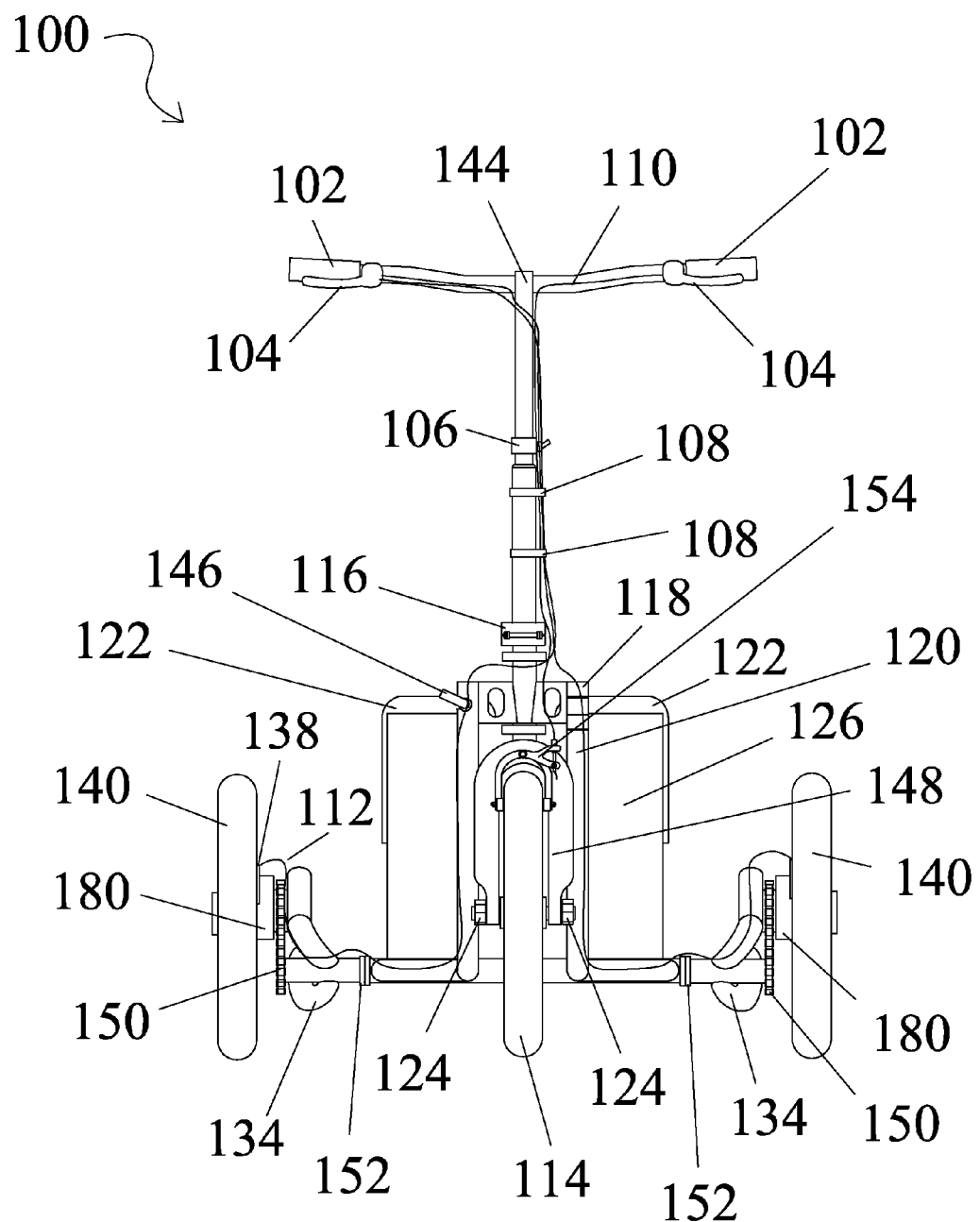
FIG. 11 is an energy efficient tricycle having a motor.
Figure 12:
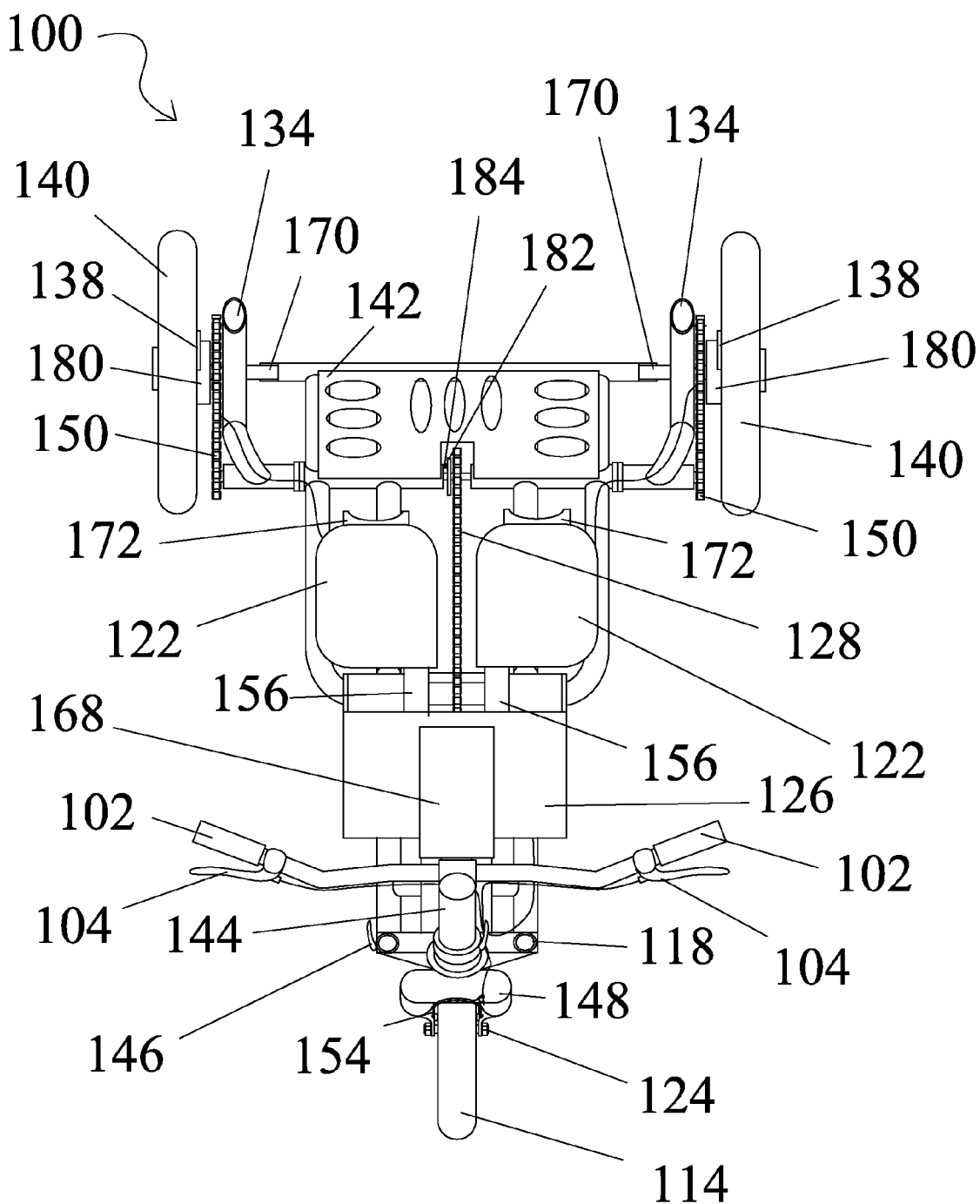
FIG. 12 is a top view of the energy efficient tricycle shown in FIG. 10.

Referring now to FIGS. 10, 11 and 12, two direct drive motors 180 are provided to allow a user to have a motorized assist while operating. A battery 168 is used to provide energy to direct drive motors 180. In this embodiment, the operator may still pedal and have the motors 180 automatically assist during given load situations such as going up hills, speed falls below a selected level or in a completely motorized mode where the pedals are not used or are only used to control the speed. Of course a throttle (not shown) may also be provided which can be mounted on hand grips 102 as is known in the art. In the motorized embodiment or even in a pedal mode if coasting, leg support 172 are provided to allow a user to rest against pedals 122 while standing on platform 142. Leg supports 172 are made of a resilient material such as foam or rubber to absorb vibration and provide a comfortable support while operating in a standing position.

Figure 13:
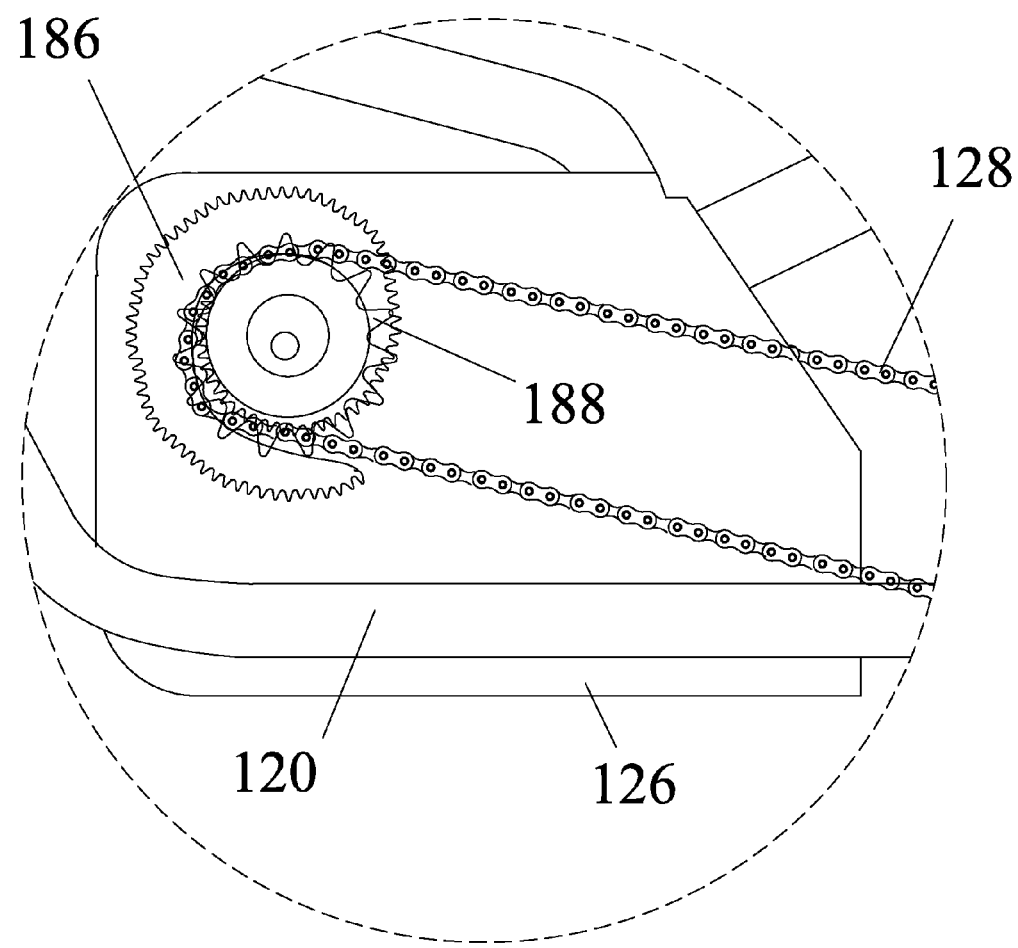
FIG. 13 is a detailed cut-away view of a portion of the energy efficient tricycle shown in FIG. 1.
Figure 14:
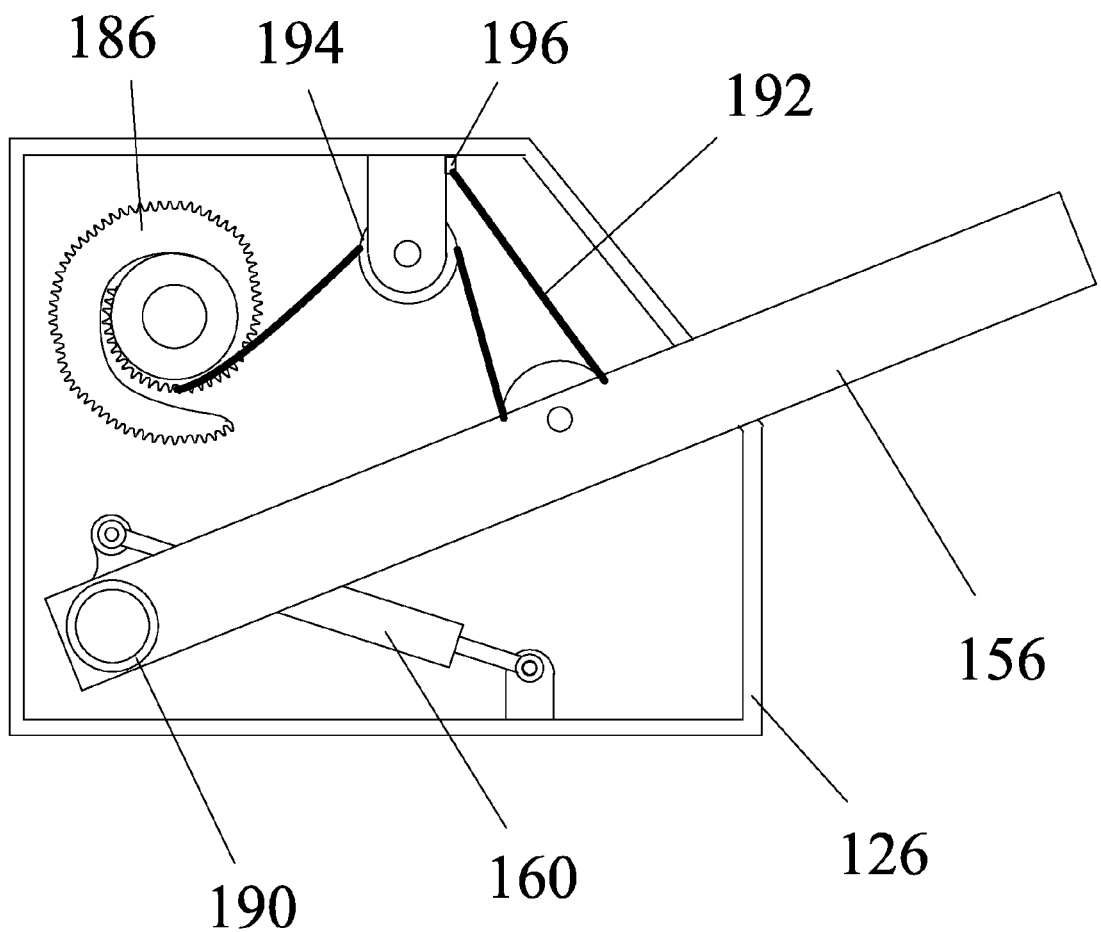
FIG. 14 is a cut-away view of the transmission of the energy efficient tricycle shown in FIG. 10.

Now referring to FIGS. 13 and 14, half of the transmission is shown. Since there are two pedals 122, the other half if the transmission is mirrored and not shown in the figures. Pedal arm 156 is rotatably anchored around a pedal arm pivot 190. Recoil piston 160 is attached to the base of cover 126 and attached to the end of pedal arm. An eccentric gear 186 is rotatably secured to the inside of cover 126 and a recoil cord 192 is attached therein. The other end of recoil cord 192 feeds around a recoil pulley and then a pulley located within pedal arm 156 and secured to cover 126 using a hold down 196. In this way, as pedal arm 156 rotates down the acceleration is get relatively constant due to the eccentricity of pulley 186. A main shaft gear 188 is centrally located to mechanically communicate with main drive chain 128 which is connected to main drive gear 166 which transmits torque to rear drive chains 150.

Now referring to FIG. 12, a sensor 184 is provided on main shaft along main drive gear 166. A sensor disk 182 has magnets or holes or both so that sensor 184 can detect rotational speed and acceleration which can be transmitted to a central processing unit (not shown) as is know in the art. In this embodiment, the CPU can automatically assist the user to add power to help even when pedaling. This option is especially helpful to users who want the benefit of exercise but may not have the stamina to rely solely on muscle power.

The energy efficient tricycle has a completely open end due the fact that the rear axle is part of the structural support rather than just a axle alone and this allows the user easy access from the back. The instant invention is designed to be operated while standing (except for the seated embodiment) and this is good for exercise, posture and visibility. The center gravity of the instant invention is very low which leads to a very stable ride. Even novice users will feel confident while operating. Unlike standard bicycles and tricycles, each pedal is independent and can be operated using only one pedal if desired. This would allow some disabled users to operate. The height of the tricycle can be adjusted which is extremely useful by allowing a user to adjust for grass, smooth road, etc.

Although the instant invention has been described in relation to particular embodiments thereof, many other variations and modifications and other uses will become apparent to those skilled in the art.

What is claimed is:

1. An energy efficient tricycle comprises:
   a frame;
   a handlebar;
   said handlebar having a generally perpendicular attachment tube;
   a steering tube;
   said attachment tube being adapted to fit within said steering tube;
   a bushing disposed on a front portion of said frame wherein said steering tube is rotatably held therein;
   a hinge portion disposed on said steering tube wherein said steering tube is foldable;
   two pedals mechanically linked to a drive mechanism;
   said pedals being biased to return to a set position in the absence of an external force;
   said steering tube having a fork portion for holding a front wheel;
   a front wheel rotatably held within said fork;
   a pair of rear wheel supports disposed on a rear portion of said frame;
   two rear wheels rotatable held in said rear wheel supports;
   a wheel drive mechanism disposed on each said rear wheel support wherein said drive mechanism is in mechanical communication with said wheel drive mechanism;
   a transmission means for distributing a force generated from said pedals when in use;
   a front wheel folding means for compactly folding said front wheel to a compact carrying configuration; and
   a rear wheel rotating means for rotating each rear wheel to a compact transportation configuration.

2. The energy efficient tricycle according to claim 1 wherein said transmission means is an elliptically mounted gear that rotates in response to a force being applied to said pedals.

3. The energy efficient tricycle according to claim 1 wherein said front wheel folding means is a hinge adapted to allow said steering tube to rotate around said hinge by loosening a steering tube lockdown clamp.

4. The energy efficient tricycle according to claim 1 further comprising a rear wheel clamp on each side of said frame wherein said rear wheel support is releasably held in place.

5. The energy efficient tricycle according to claim 4 wherein said rear wheel folding means is a bushing disposed on each side of said frame wherein said rear wheel support is allowed to rotate to a storage configuration when said rear wheel clamp is released.

6. The energy efficient tricycle according to claim 1 wherein said pedals are independently operable.

7. The energy efficient tricycle according to claim 1 further comprising a platform disposed on a rearward portion of said frame wherein a user may stand.

8. The energy efficient tricycle according to claim 1 further comprising a pair of leg rests disposed on a rearward facing portion of said pedals wherein a user can comfortably rest against while in operation.

9. The energy efficient tricycle according to claim 1 further comprising a rear wheel height adjustment means for adjusting an operating height of said energy efficient tricycle wherein said operating height is selected to match vehicle operating conditions.

10. The energy efficient tricycle according to claim 1 further comprising a sensor disposed on said drive mechanism wherein rotational speed is measured.

11. The energy efficient tricycle according to claim 10 further comprising a motor in mechanical communication with at least one of said wheels wherein motive power is selectably available to assist in moving said energy efficient tricycle.

12. The energy efficient tricycle according to claim 1 wherein said energy efficient tricycle is adapted to be operated in a standing mode.

13. The energy efficient tricycle according to claim 1 further comprising a pair of disc brakes disposed on each of said rear wheels;
a brake grip disposed on said handlebar; and
a brake cable in mechanical communication with said disc brake and said brake grip wherein when said brake grip is compressed, said disc brake is engaged.

14. The energy efficient tricycle according to claim 11 further comprising a seat disposed on said frame wherein a user may operate said tricycle when said motor is engaged.

15. The energy efficient tricycle according to claim 1 further comprising a height adjustment means for adjusting the operating height above a surface.

16. The energy efficient tricycle according to claim 15 wherein said height adjust means is a structural element having a plurality of user selectable openings and a locking pin.

* * * * *